(No Model.)

E. L. ROGERS.
SHEET METAL KNOB FASTENING DEVICE.

No. 470,919. Patented Mar. 15, 1892.

Witnesses
Walter S. Bowen
Alfred E. Joy

Inventor
Ernest L. Rogers
By his Attorney
Louis W. Southgate

UNITED STATES PATENT OFFICE.

ERNEST L. ROGERS, OF WORCESTER, MASSACHUSETTS.

SHEET-METAL-KNOB-FASTENING DEVICE.

SPECIFICATION forming part of Letters Patent No. 470,919, dated March 15, 1892.

Application filed June 4, 1891. Serial No. 395,073. (No model.)

*To all whom it may concern:*

Be it known that I, ERNEST L. ROGERS, a citizen of the United States, residing at Worcester, in the county of Worcester and State of Massachusetts, have invented a new and useful Improvement in Knob-Fastening Devices, of which the following is a specification.

The aim of this invention is to produce an improved fastening device by which a knob may be fastened in place so that the same cannot be unscrewed by twisting on the knob.

To this end the invention consists of the device described and claimed in this specification and illustrated in the accompanying drawings, in which—

Figure 1:
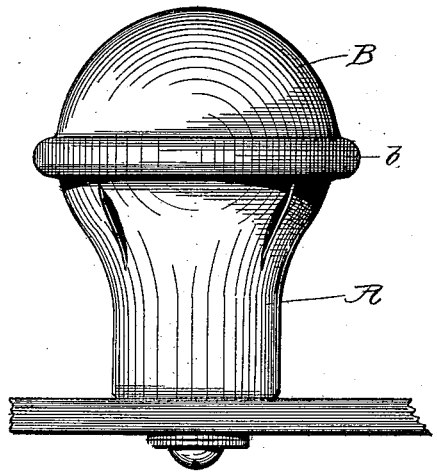
Figure 2:
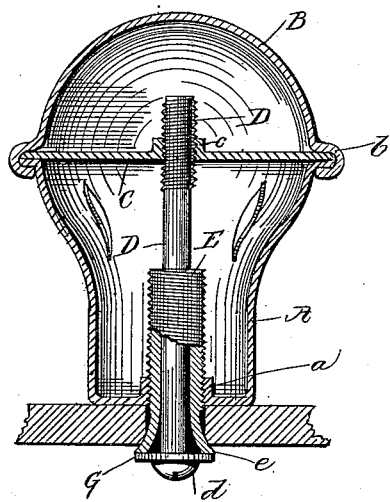

Figure 1 is a side elevation of my improved knob, and Fig. 2 is a longitudinal sectional view thereof.

In detail A B represents a knob of any of the usual constructions, and the same, as specifically shown, consists of the body-piece A and the top or cover B. The base or body-piece A may be made of any suitable material, and the top or cover B may be struck up out of sheet metal and the same may be flanged over, the base or body-piece A by means of the lip $b$, in the usual manner.

Formed or fastened inside of the knob is a disk, as C, and the preferable way to make this disk is to make the same out of sheet metal and interpose the same between the two sections of the knob, so that the disk will be firmly caught and held between the same, as shown, as the parts A and B are fastened together. If a sheet-metal disk is used, the same is pricked in, as at $e$, and with all constructions the disk is tapped at its center to receive the screw D. The screw D thus tapped into the disk C forms by itself an improved device for fastening the knob in place, as it will be seen that the screw draws or pulls on the piece A and that by this means the knob can be held very firmly. The bottom of the base is tapped, as at $a'$, to receive the screw-threaded tube E and the screw D fits loosely through the inside of this tube E. The head of the tube E is enlarged, as at $e$, in any suitable manner—as, for example, by forcing a conical die into the same. This portion $e$ of the tube E forms the bearing for holding the knob in place. The head $d$ of the screw D bears against the tube E, and, if desired, a washer G may be interposed between the same. This washer G is not necessary and is only used in some special locations. The tube E is threaded at an opposite pitch to that of the screw D. As shown, the tube E has a left-hand thread and the screw D a right-hand thread. The knob is caught in position by first screwing the same onto the tube E. Now the screw D is inserted in the tube E and is screwed home in the piece C. It is impossible to unscrew the knob by twisting on the same, as the knob cannot start to unscrew from the tube E, as the movement that would unscrew the same from the tube would tend to screw the same tighter on the screw D, or even if this does not take place the screw holds the knob from moving away from the tube E, as there is no tendency to unscrew the screw D. The reverse movement tends to screw the knob tighter on the tube E. The knob is removed by first unscrewing the screw D and then unscrewing the knob from the tube E. Thus it will be seen that the knob is securely fastened in place and that the same cannot be removed, no matter how hard the knob may be twisted in either direction, and, further, it will be seen that the knob is doubly held in place.

This fastening device can be made very cheaply, as the disk C can be stamped and pricked at one operation and then tapped. The tube E is preferably made of the cheap wrought-iron tubing of commerce and can be threaded and cut off in a screw-machine very rapidly. Then all that is necessary to complete the same is to force a die into the end of the same to expand the same in the manner described. Of course a tube formed with a shoulder or collar is the equivalent of this construction.

As this invention is essentially a knob-fastening device, I may apply and use the same with any form of knob to which the same can be applied, no matter whether the knob is made of sheet metal or not and no matter what the construction of the knob is.

The details of construction herein shown may be greatly varied by a skilled mechanic without departing from the scope of my invention.

Having thus fully described my invention, what I claim, and desire to secure by Letters Patent, is—

1. A knob having a disk in the interior of the same, the tube tapped in the bottom of the knob, and the screw passing through the tube and tapped in the disk, substantially as described.

2. A knob having a disk in the interior of the same, the tube tapped in the bottom of the knob, and the screw passing through the tube and tapped in the disk, the tube having a thread of opposite pitch from that of the screw, substantially as described.

3. A knob having a disk in the interior of the same, the tube tapped in the bottom of the knob, and the screw passing through the tube and tapped in the disk, the end of the tube being flanged or struck over to form a bearing, substantially as described.

In testimony whereof I have hereunto set my hand in the presence of two subscribing witnesses.

ERNEST L. ROGERS.

Witnesses:
LOUIS W. SOUTHGATE,
W. B. GREENE.